Oct. 30, 1923.

H. O. CONRAD 1,472,513

CLUTCH PEDAL OPERATING DEVICE

Filed Oct. 21, 1922

INVENTOR.
Henry O. Conrad.
BY
Geo. Kimmel
ATTORNEY.

Patented Oct. 30, 1923.

1,472,513

UNITED STATES PATENT OFFICE.

HENRY O. CONRAD, OF BEAR GROVE TOWNSHIP, GUTHRIE COUNTY, IOWA.

CLUTCH-PEDAL-OPERATING DEVICE.

Application filed October 21, 1922. Serial No. 596,056.

*To all whom it may concern:*

Be it known that I, HENRY O. CONRAD, a citizen of the United States, residing at Bear Grove Township, in the county of Guthrie and State of Iowa, have invented certain new and useful Improvements in Clutch-Pedal-Operating Devices, of which the following is a specification.

This invention relates to a clutch pedal operating device, designed primarily for use on "Fordson" tractors, but it is to be understood that a device in accordance with this invention, can be employed for any purposes wherein it is found applicable, and the invention has for its object, to provide, in a manner as hereinafter set forth, a clutch pedal operating device which may be attached to the tractor without necessitating any alterations thereto, and by means of which the clutch pedal may be shifted to lock the clutch mechanism of the tractor in operative position, while the operator is standing upon the ground, and maintain the clutch mechanism in such position, and further permitting of the device to be shifted in an opposite direction to release the clutch mechanism of the tractor when the operator is standing on the ground.

In "Fordson" tractors, the clutch pedal is so arranged, that to operate it, it is necessary for the operator to be seated upon the seat of the tractor, and as these tractors are extensively used while stationary, as power plants for driving various types of machinery, it is quite inconvenient to operate the clutch pedal when operating it from the seat of the tractor as, it requires unnecessary time for the operator to mount the seat of the tractor, and to provide for the convenient operating of the clutch pedal, as well as overcoming the inconveniences set forth, is the primary object of this invention, and to this end, the invention aims to provide, in a manner as hereinafter set forth, a clutch pedal operating device which is simple in its construction and arrangement, capable of being operated from the tractor or from the ground, strong, durable, compact, efficient in its use, readily set up and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
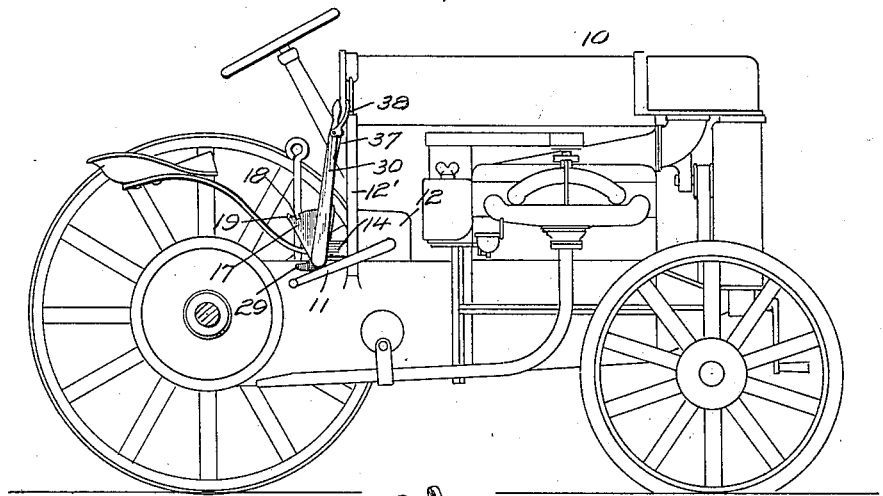
Figure 1 is a side elevation of a tractor, having one traction wheel removed and further showing the adaptation therewith, of a clutch pedal operating device, in accordance with this invention.
Figure 2:
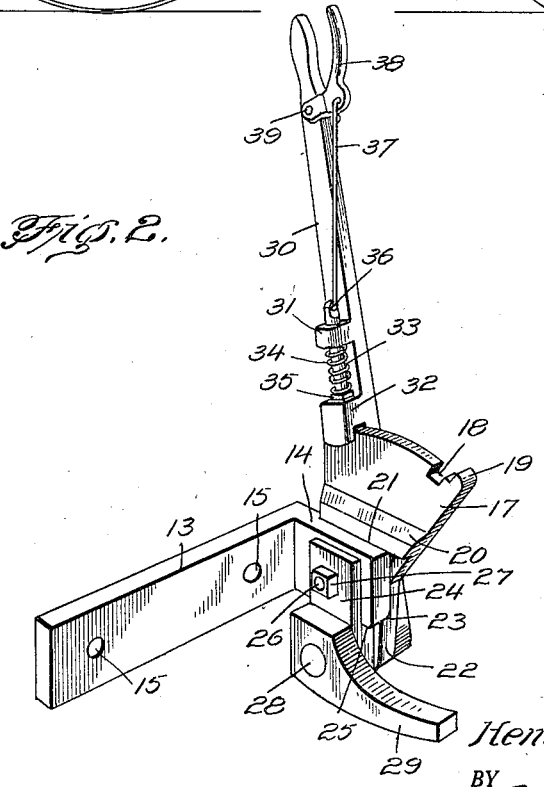
Figure 2 is a perspective view of a clutch pedal operating device, in accordance with this invention.

Referring to the drawings in detail, the tractor is indicated generally by the reference character 1, and which includes a clutch arm or pedal 11, and a casing 12, which incloses the steering gears.

A clutch pedal operating device, in accordance with this invention, is adapted to be supported from the dashboard 12', and extended over the arm 11, so that when the device is operated in one direction, it will actuate the pedal 11, causing the locking of the clutch mechanism, and when operated in the other direction will provide for the release of the clutch mechanism of the tractor.

A clutch pedal operating device in accordance with this invention, includes a supporting member, formed of an L-shaped bar, having the elongated leg thereof indicated at 13, and the short leg at 14. The leg 13, is provided with a plurality of openings 15, through which is adapted to extend suitable hold-fast devices, not shown, for fixedly securing the supporting member in position. The leg 13, of the supporting member, is adapted to be positioned against the forward side of the casing 12. The arm 14, of the supporting member, is disposed in parallelism with respect to one end of the casing 12, but spaced therefrom, and positioned against the outer face of the arm 14, is a quadrant shaped plate 17, having a toothed upper edge as at 18, and further formed with a stop lug 19, at one end of the toothed upper edge of the plate. One side of the plate 17, is formed with a transversely extending offset 20, which forms a shoulder 21, seating on the top edge of the leg 14. The plate 17, has a depending extension 22, which is shouldered on one face as at 23, and engages with the bottom edge of the leg 14.

Arranged against the inner face of the leg 14, is a depending hanger arm 24, which is shouldered on its outer face as at 25, and engages the lower edge of the arm 14.

By setting up the extension 22, and hanger arm 24, in a manner as stated, the said extension and arm overlap the bottom edge of the leg 14, and extending through the leg 14, the lower portion of the plate 17, and upper portion of the arm 24, is a clamping bolt 26, provided with a lock nut 27, and by the employment of the bolt 26, and lock nut 27, the plate 17, and arm 24, are clamped to the leg 14.

Journaled in the lower portion of the extension 22, and in the lower portion of the arm 24, is a rock shaft 28, which is arranged below the bottom edge of the leg 14, and is of a length as to project inwardly from the arm 24, and outwardly from the extension 22.

Fixed to the inner end of the shaft 28, is a pedal actuating foot 29, having a curved lower face and which projects rearwardly with respect to the shaft 28, and is arranged over the pedal 21, so that when the shaft 28, is rocked in one direction, the pedal 11, will be shifted to lock the clutch mechanism, and when the shaft 28, is rocked in the opposite direction, the foot 29, will be shifted upwardly to provide for the release of the clutch mechanism.

The shaft 28, is rocked through the medium of an upwardly extending lever 30, which normally extends forwardly with respect to the driver's seat, so that when rocking the shaft 28, to cause the foot 29, to shift the pedal 11, to lock the clutch mechanism, the lever 30, will be swung rearwardly. The lever 30, is fixedly secured at its lower end to the outer end of the shaft 28, and is arranged against the outer face of the plate 17. The inner side of the lever 30, is formed with an apertured lug 31, and also with an apertured guide member 32, arranged below the lug 31, and straddling the top of the plate 17. Extending through the lug 31, and guide 32, is a locking dog 33, adapted to engage in one of the teeth, at the top edge of the plate 17, to lock the lever 30, in the position to which it has been shifted. Surrounding the dog 33, and interposed between the lug 31, and guide 32, is a coiled spring 34, bearing against a collar 35, carried by the dog 33, for the purpose of normally maintaining the dog 33, in engagement with one of the teeth of the plate 17. The dog 33, projects above the lug 31, and has connected to its upper end, as at 36, a shifting rod 37, which is connected to a bell crank arm 38, pivoted as at 39, in proximity to the upper end of the lever 30. The arm 38, when moved toward the lever 30, carries the rod 37, therewith, which in turn will elevate the dog 33, clear of a tooth of the plate 17, permitting of the shifting of the lever 30.

The lug 19, on the plate 17, arrests the rearwardly shifting movement of the lever 30, as the lug 19, is positioned in the path of the guide 32.

From the foregoing description taken in connection with the accompanying drawings, a clutch pedal operating device is set up which does not require the connecting of the pedal thereto, and furthermore a device that can be readily attached to any tractor without altering the latter in any manner, and although the preferred embodiment of the invention is as illustrated and described yet it is to be understood that changes in the details of construction can be had without departing from the spirit of the invention.

What I claim is:—

1. A device for the purpose set forth comprising an L-shaped supporting member, a toothed plate positioned against and depending from one of the legs of said member, a hanger arm positioned against and depending from said leg of said member, means for clamping said arm and said plate to said leg of said member, a shaft journaled in said arm and plate below said leg, a lever having its lower end pivotally connected to one end of said shaft and carrying a spring controlled locking dog engaging the said plate, and a curved clutch pedal actuating foot carried on the other end of said shaft and projecting rearwardly therefrom.

2. A device for the purpose set forth comprising an L-shaped supporting member, a toothed plate positioned against and depending from one of the legs of said member, a hanger arm positioned against and depending from said leg of said member, means for clamping said arm and said plate to said leg of said member, a shaft journaled in said arm and plate below said leg, a lever having its lower end pivotally connected to one end of said shaft and carrying a spring controlled locking dog engaging in said plate, and a curved clutch pedal actuating foot carried on the other end of said shaft and projecting rearwardly therefrom, said arm and said plate shouldered to overlap the lower edge of said leg.

3. A device for the purpose set forth comprising an L-shaped supporting member, a toothed plate positioned against and depending from one of the legs of said member, a hanger arm positioned against and depending from said leg of said member, means for clamping said arm and said plate to said leg of said member, a shaft journaled in said arm and plate below said leg, a lever having its lower end pivotally connected to one end of said shaft and carrying a spring controlled locking dog engaging in said plate, a curved clutch pedal actuating foot carried on the other end of said shaft and projecting rearwardly therefrom, said plate provided with a pair of shoulders, one engaging the top edge and the other the lower edge of said leg, and said arm provided with a shoulder engaging the lower edge of said leg.

4. A device for the purpose set forth comprising a support, a toothed plate overlapping said support, a hanger arm overlapping said support, means for securing the plate and arm to said support, a rock shaft journaled in the plate and arm below said support, a lever fixed to one end of said support and having means engaging in the plate to arrest movement of the lever, and a clutch pedal actuating foot fixed to the other end of said shaft and projecting rearwardly therefrom.

In testimony whereof, I affix my signature hereto.

HENRY O. CONRAD.